Jan. 1, 1946. S. J. MACKEY ET AL 2,391,991
AIRPLANE DISPATCHING SYSTEM
Filed Dec. 5, 1941 6 Sheets-Sheet 1

INVENTORS
S. J. Mackey and H. S. Wynn
BY Neil W. Preston
THEIR ATTORNEY

Jan. 1, 1946.  S. J. MACKEY ET AL  2,391,991
AIRPLANE DISPATCHING SYSTEM
Filed Dec. 5, 1941   6 Sheets-Sheet 3
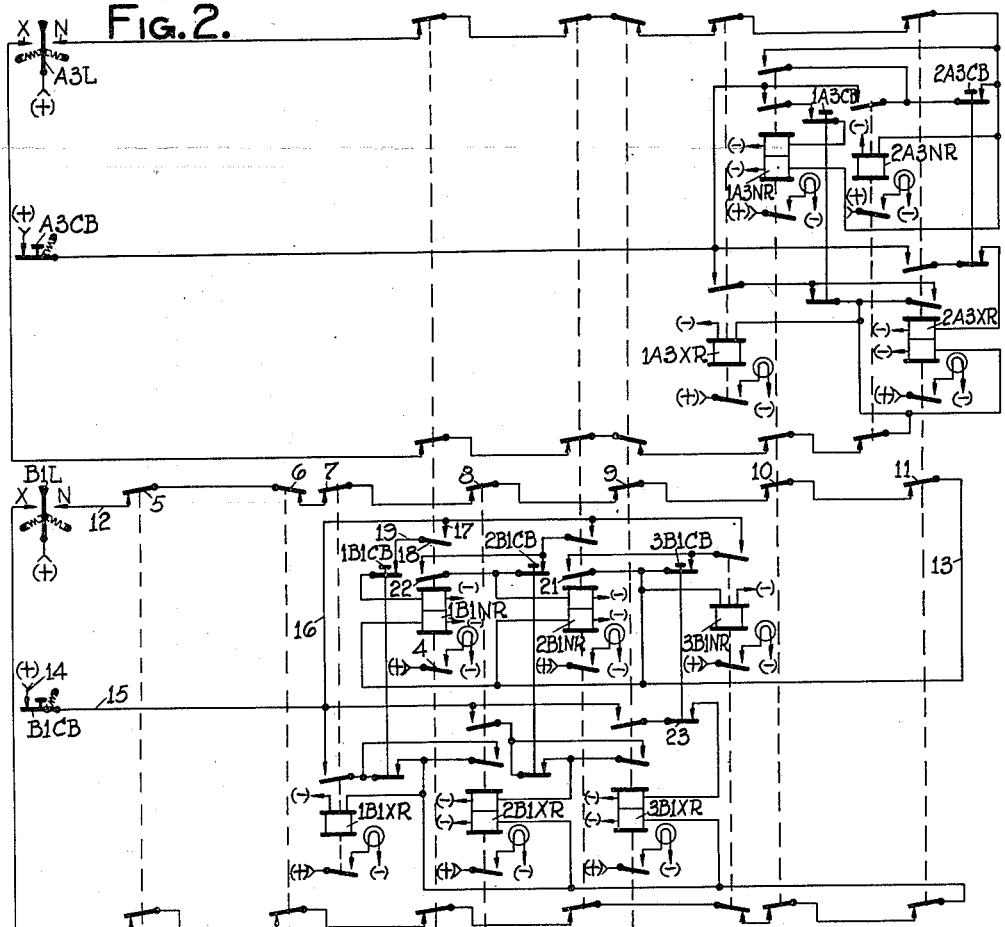
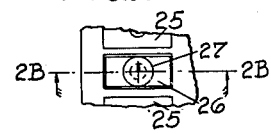
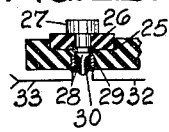
INVENTORS
S.J.Mackey and H.S.Wynn
BY
THEIR ATTORNEY Jan. 1, 1946.   S. J. MACKEY ET AL   2,391,991
AIRPLANE DISPATCHING SYSTEM
Filed Dec. 5, 1941   6 Sheets-Sheet 4
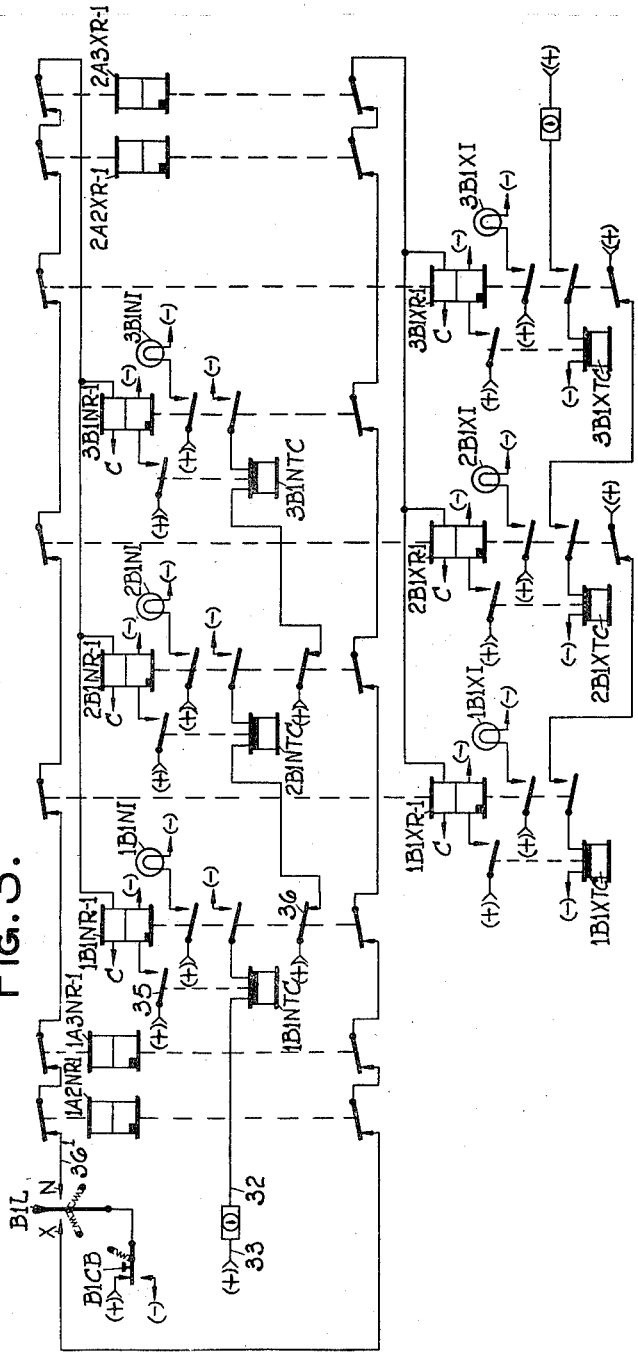
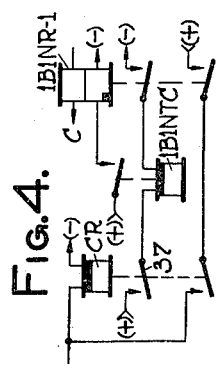
INVENTORS
S.J. Mackey and H.S. Wynn
BY Neil D. Preston,
THEIR ATTORNEY

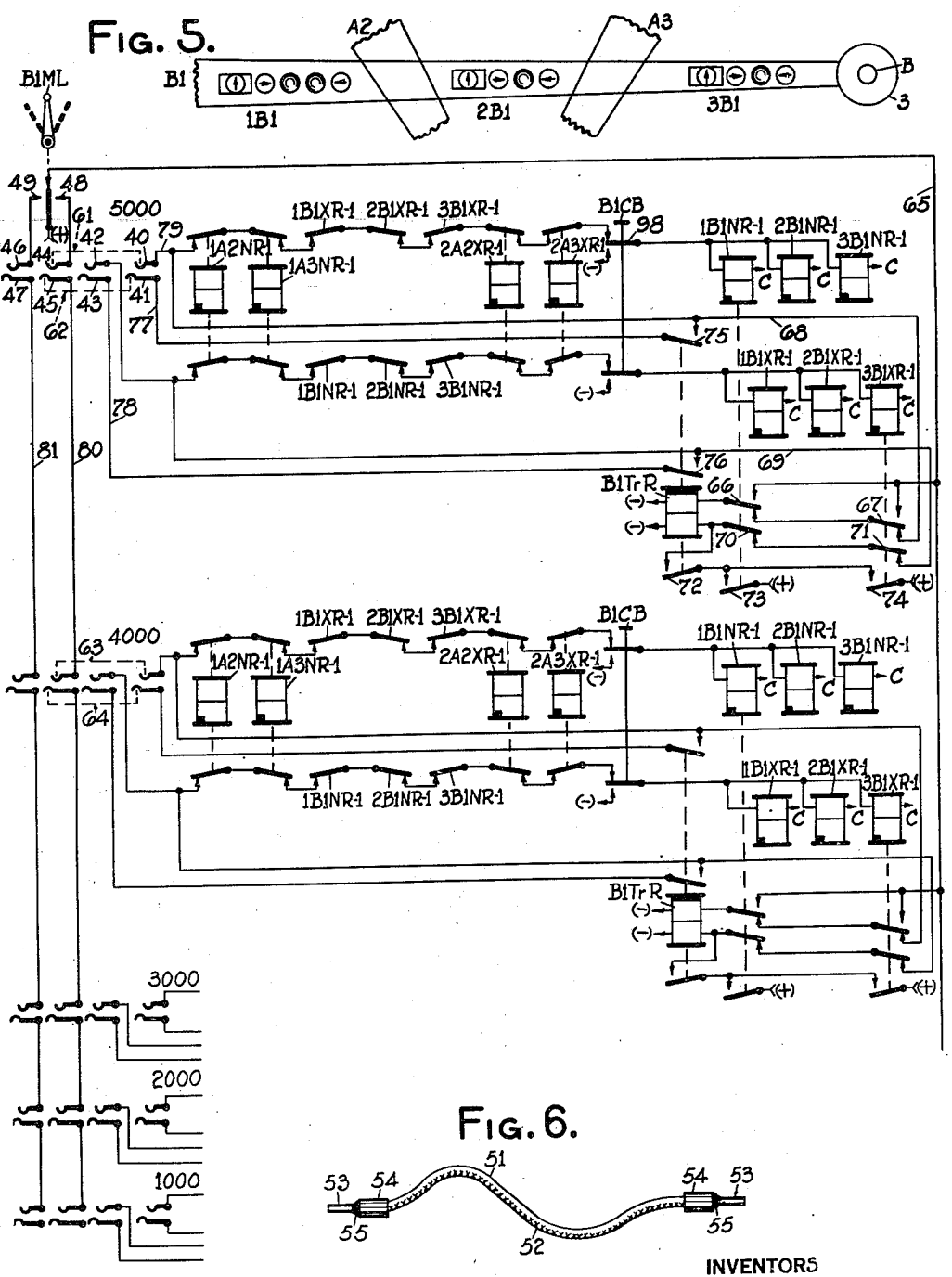
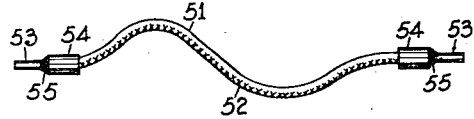

Jan. 1, 1946. S. J. MACKEY ET AL 2,391,991
AIRPLANE DISPATCHING SYSTEM
Filed Dec. 5, 1941 6 Sheets-Sheet 6
FIG. 7.
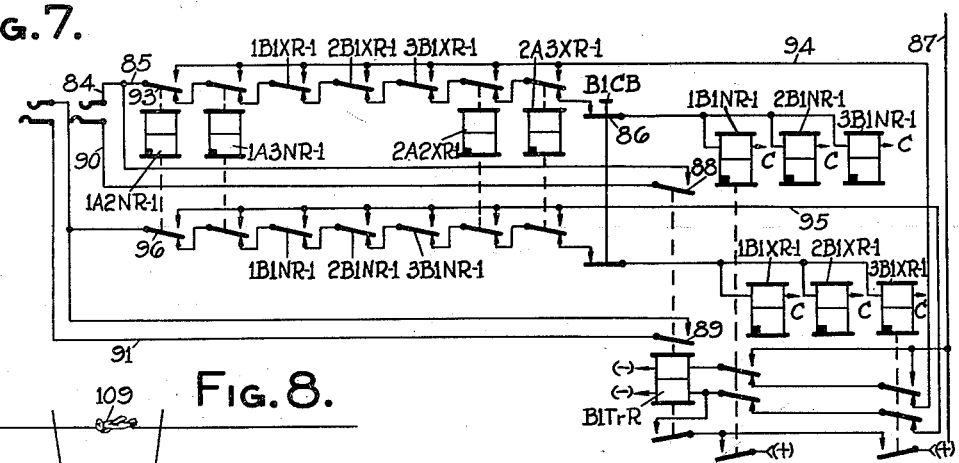
FIG. 8.
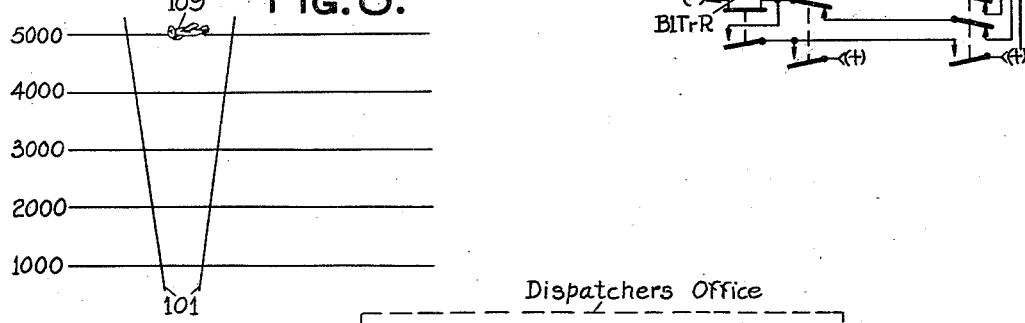
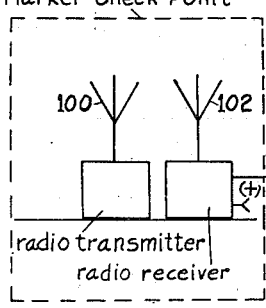
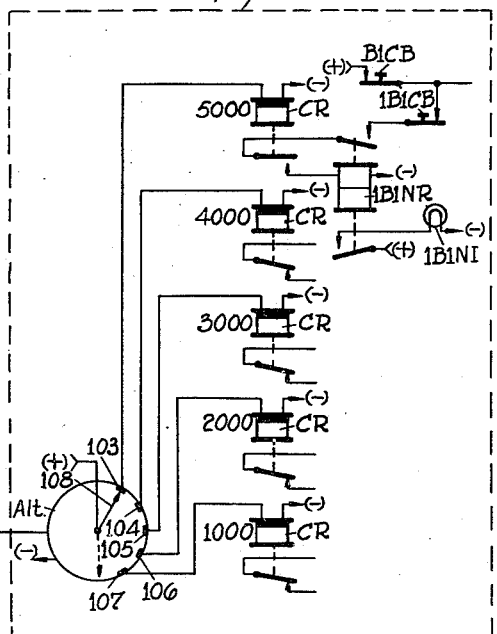
INVENTORS
S. J. Mackey and H. S. Wynn
BY Neil H. Preston
THEIR ATTORNEY Patented Jan. 1, 1946

2,391,991

UNITED STATES PATENT OFFICE 2,391,991

AIRPLANE DISPATCHING SYSTEM

Stuart J. Mackey, Rochester, and Harold S. Wynn, Pittsford, N. Y., assignors to General Railway Signal Company, Rochester, N. Y.

Application December 5, 1941, Serial No. 421,828

29 Claims. (Cl. 177—353)

This invention relates in general to airplane dispatching systems and has more particular reference to systems for controlling airplane flights throughout a given territory by means of a control panel which gives visual information of the positions of planes at all times and results in safeguarding against accident.

The system contemplates flight by planes along radio range beams or routes otherwise defined, and at various elevations spaced from each other a sufficient distance, as by 500 feet above and below, so as to safeguard against collision between planes at different elevations. Planes flying, however, at the same elevation might collide, due to opposing flights and conflicting flights, and this is guarded against by interlocking means associated with the panel.

One object is to provide means for setting up a route if it be available, and for visually indicating the route set up. Another object is to provide means for cancelling parts, or all of a route set up, either manually by the dispatcher upon receipt of information obtained from the pilot of the plane, or by means automatically responding to the presence of the plane at given positions.

A further object is to provide means for automatically selecting the route of next most desirable elevation, if the route of most desirable elevation is not available, thus to simplify the duties of the dispatcher.

Further objects, purposes and characteristic features of this invention will appear as the description progresses, reference being made to the accompanying drawings showing purely in a diagrammatic form and in no manner whatsoever in a limiting sense, several forms which the invention can assume. In the drawings:

Fig. 2 is a circuit diagram of one form of the invention.

Fig. 2A is a diagrammatic view of a form of identifying token employed in the invention.

Fig. 2B is a section on line 2B—2B of Fig. 2A viewed in direction of arrows.

Fig. 3 is a circuit diagram of a second form of the invention.

Fig. 4 is a fragmentary circuit diagram of a modification of the form of invention of Fig. 3.

Fig. 5 is a circuit diagram of another form of the invention.

Fig. 6 is a view of a plug jack connector employed in the invention.

Fig. 7 is a fragmentary circuit diagram of a modification of the form of invention shown in Fig. 5.

Fig. 8 is a diagrammatic view of automatic cancelling means employable with all of the various forms of invention.

Figure 1:
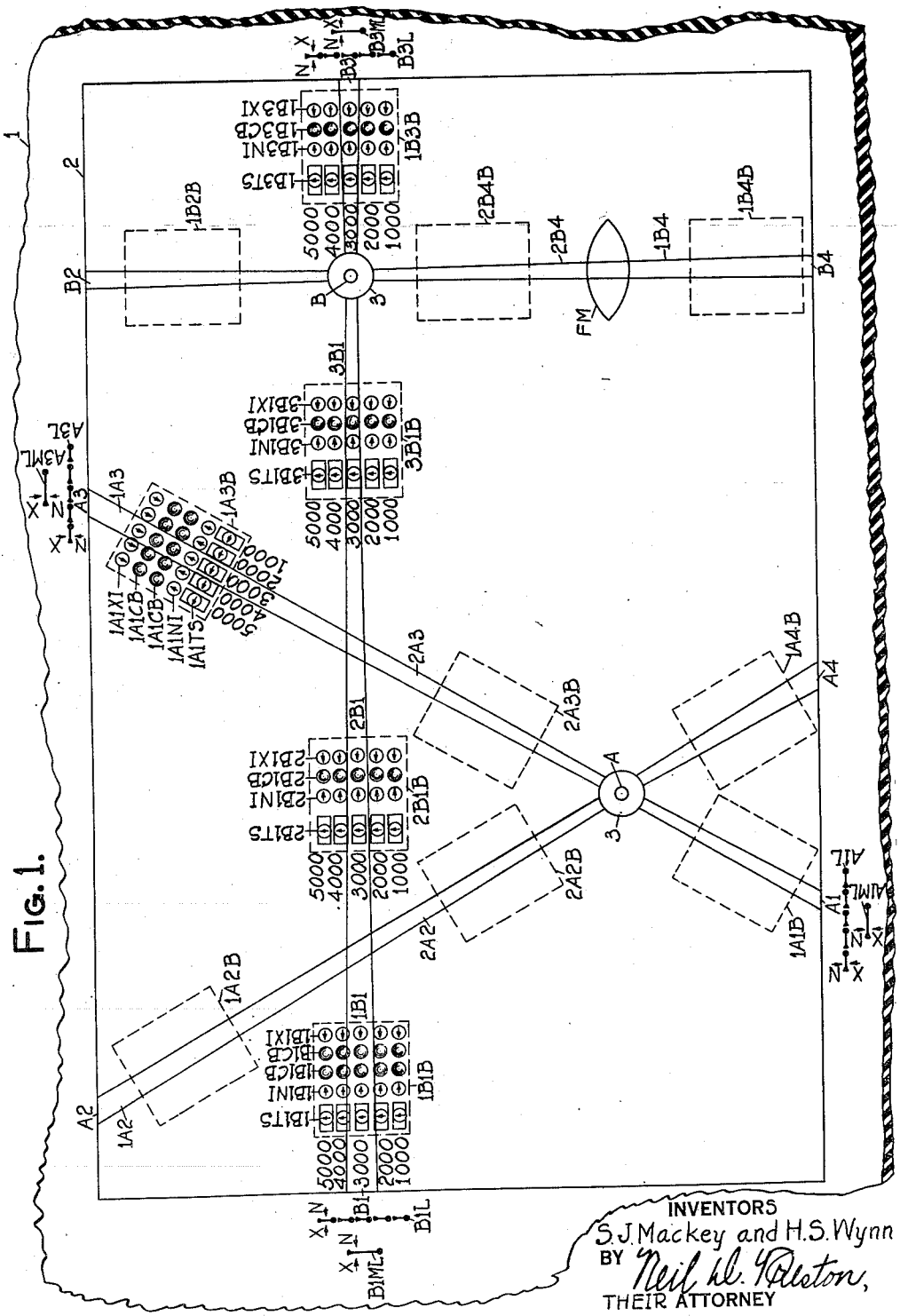
Fig. 1 is a schematic view showing the dispatcher's panel with some of its associated parts.
Figure 1A:
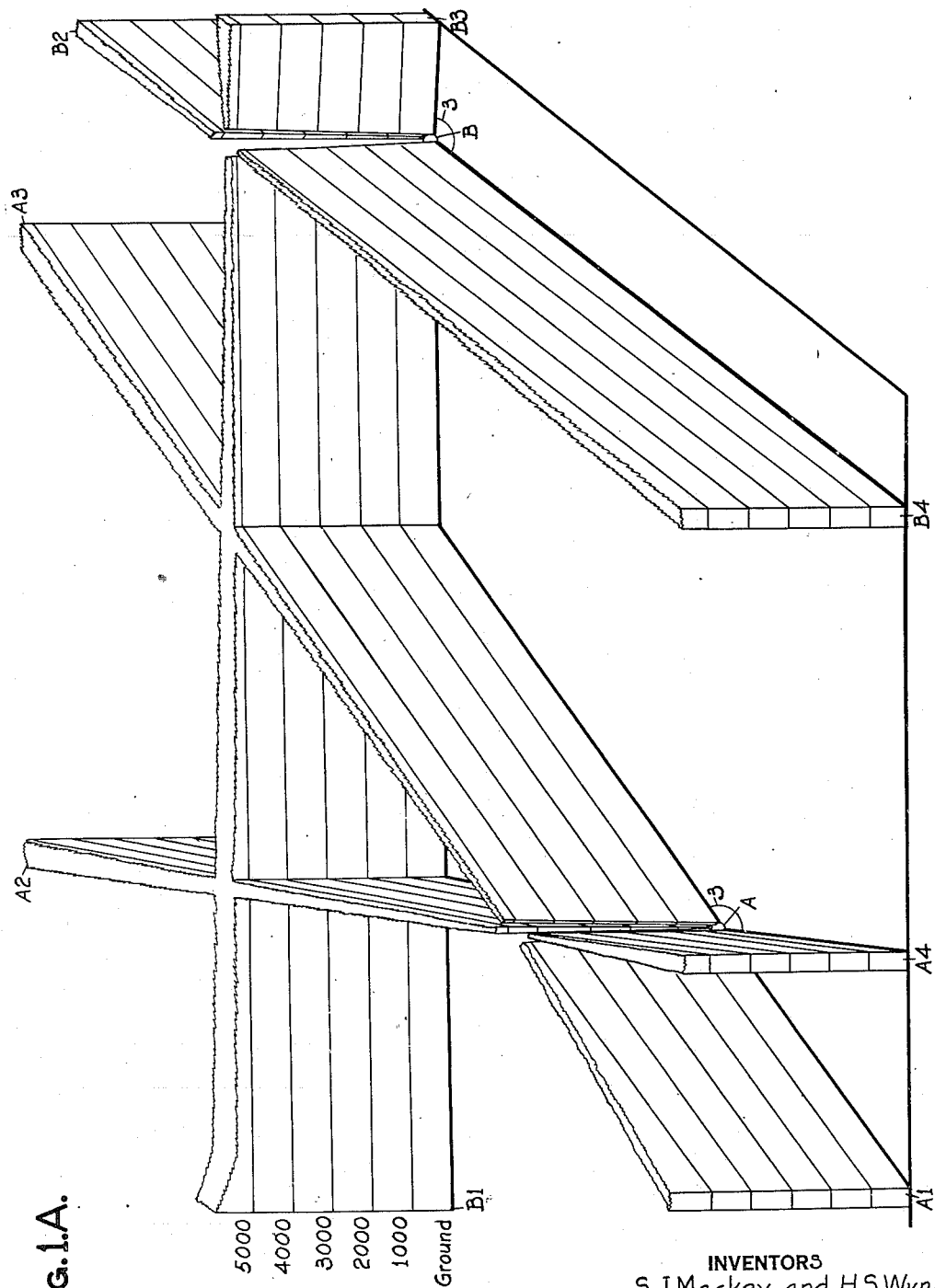
Fig. 1A is an isometric view of the region controlled by the system of this invention.

Referring first to Fig. 1, there is here represented a panel 1 on which is represented a control area defined by the rectangle 2. This area may be relatively small or large in extent, depending upon congestion of traffic, and various other considerations. It may cover only a few hundred square miles or it may cover thousands of square miles. The area may or may not include airports but in the example shown, includes two airports, A and B. This can be readily appreciated from the showing in Fig. 1A.

These ports A and B are represented as each having an area as indicated by circles 3, which may be possibly several miles in diameter within which the control of planes is in the hands of the particular airport authority, and within which planes are grounded or raised to various elevations in general which they are to maintain in their flight. The area controlled by the operator of the panel illustrated is exclusive of these limited individual port areas. The control within the limited port areas can be of the type, for example, as disclosed in the Brixner application, Ser. No. 211,961, filed June 4, 1938, now Patent No. 2,268,240, dated December 30, 1941.

These ports A and B are assumed to include radio range stations and to send out radio range beams along which planes can travel toward and away from the ports. The station A sends out the four range beams A1, A2, A3 and A4, while the station B sends out range beams B1, B2, B3 and B4. These beams are divided into various sections by radio beacons, or markers, in accordance with traffic requirements. The sections may be defined by markers where two beams intersect whereby a pilot can readily identify the check point as he passes it. Other markers employed for defining the various sections can be Z markers occurring at airports such as at ports A and B and also may be of the fan marker type, as the marker FM. Thus, regardless of just what the particular beacon or check point may be the beams are divided into convenient sections in such manner that the pilot can readily identify the point at which he passes from one section to the next.

Considering beam B1, it is seen that it is intersected by beams A2 and A3, and thus beam B1 is conveniently divided into the three sections IB1, 2B1 and 3B1. The other beams such as A2, for example, comprise sections 1A2 and 2A2, and likewise for the other beams as shown on the diagram.

Each beam section has associated with it a board such, for example, as the board 1B1B for section 1B1. This board not only serves to carry indicators and the like for its section at a given height but also for its section at a plurality of differing heights, there being shown five heights indicated on the diagram and running from 1000 through 5000 feet but it is to be understood that this is merely illustrative and that there may be many additional heights indicated on the panel.

For each height, such, for example, as the 5000 foot height, there is placed on the board, as board 1B1B, a token slot 1B1TS which is constituted so as to have a depressed portion for receiving an identifying token, as will be explained below. Also, for this same height, namely, the 5000 foot height, there is an entrance, or N, indicator 1B1NI, carrying an arrow or the like which can be illuminated and which points in the entrance direction which is assumed to be toward the port. The board also carries an exit, or X, indicator 1B1XI, the arrow of which points outwardly, or away from the port. In addition, there is a route cancelling button B1CB which is manually operable, and can be operated on information received from the pilot, and, when operated, is effective to cancel not only the section but the entire route, and hence is identified, as above, as the cancelling button for the entire route B1.

In order that the route can be used for more than one plane at the same time, that is, by a forward plane and a following plane, it is desirable to be able to cancel individual sections of a route, and thus the board includes a section cancelling button identified as 1B1CB, which indicates that the cancelling button, when operated, is effective to cancel only the section 1B1.

The route cancelling button and the section cancelling button are effective both for entrance and exit moves, as will appear below, and are preferably biased to normal position, and so return to normal when released.

Board 2B1B for section 2B1 differs from the board described just above only in that it does not include a route cancelling button since the route cancelling function has already been cared for by button B1CB on board 1B1B.

With regard to a route composed of a single section such as route B2, there will of course be only a single cancelling button preferably designated as a route cancelling button.

For setting up routes, a lever is provided for each route at each elevation, and thus, in connection with routes B1 it is seen that at each elevation there is a lever designated collectively as B1L. These levers are placed opposite their respective height designations and are of the self-restoring type being biased to the neutral position and are movable either toward the airport or away from it in the N or X direction, as indicated in connection with routes B1. Thus, one can readily ascertain if a route is available for entrance or exit traffic and if so available one may operate the lever to set up the route as manifested by the lighting up of the particular entrance or exit indicators on the boards involved so as to display a line of lighted arrows to readily show the dispatcher that the route is available and is set up and reserved. The dispatcher can then advise the plane pilot as to what route he should take and at a particular elevation.

It can be seen that, should the dispatcher desire to route a plane in the entrance direction on route B1 at the elevation of 5000 feet he will move this individual lever B1L to the right and then allow it to return to its neutral position. If the route is not available the indicators will not become energized, and to obtain a route he must then operate a lever for some other elevation on B1 or a lever for some other route at the same or different elevation, and thus continue until a route is obtained.

To avoid this extra operation of levers a master lever is provided for each set of routes, as, for example, the master lever B1ML for the routes B1. This lever can be connected by means to be described below so as to select the routes B1 at the various elevations in any order of preference set up by the dispatcher whereby to select the most preferred route which is at that time available. Thus, the master lever avoids much lever operation of individual levers and automatically selects a route as will appear more clearly as the description progresses.

The board can be arranged in various manners, and in one, as shown in Fig. 1, the levers and the various designations of height, etc., have been arranged to read from left to right and from bottom to top. The levers are movable in the direction of the desired flight in every instance whereby to give the dispatcher a pictorial representation of the traffic situation, and the routes desired to be set up. On any route, if it is desired to set up traffic toward a particular port the lever is moved toward that port and conversely a move away from the port requires a lever movement away from the port so that no confusion can arise in the dispatcher's mind.

Referring now to Fig. 2 there is here represented a circuit arrangement for one form of control of one of the routes B1 and the conflicting routes A2 and A3. As shown, the individual levers for a given elevation such as 5000 feet, for the three routes are identified as B1L, A2L and A3L. While the routes B1 at the various different elevations are assumed to not be conflicting, it is clear that at any given elevation such as 5000 feet, a route should not be set up for entrance moves if it is already set up for exit moves. Furthermore, it should not be set up for either entrance or exit moves if a plane is moving toward the port A on route A2 and has not passed out of section 1A2, and this also applies to the route A3. Furthermore, a plane making an exit move from port A and not having passed out of either sections 2A2 or 2A3 should prevent setting up of a route on B1 for the same elevation.

As shown, each section of each route at each elevation has a control relay for entrance traffic and one for exit traffic. The three sections of route B1 have three entrance control relays 1B1NR, 2B1NR and 3B1NR while for exit traffic there are three relays 1B1XR, 2B1XR and 3B1XR. Each one of these relays as 1B1NR when energized in turn energizes its indicator through a contact finger as 4 and front point, to thus visually indicate that the route is available and is set up. These relays are energized if the route be available in multiple upon the lever being moved for the desired direction of traffic.

For example, assuming that route B1 is desired for entrance traffic, lever B1L is moved from its biased normal position to the right to the N position, and provided there is no opposing or conflicting routes set up the various interlocking back contacts 5, 6, 7, 8, 9, 10 and 11 of the relays controlling these opposing or conflicting sections, as described above are all made up. Energy thus passes from the lever through wire 12, the various contacts 5, 6, etc., to wire 13, and thence in multiple to the three relays 1B1NR, etc., controlling this entrance route so as to pick up these relays and visually show the dispatcher by the energization of the various indicators such as 1B1N1, etc., that the route is available and is set up. He can then notify the plane pilot that he should proceed at the height selected along the range beam selected and that he will have safe travel conditions. If there be any conflict, however, one or more of the interlocking contacts 5, 6, etc., will be in attracted position and hence the route will not be obtained and the dispatcher must select a different route and attempt to set it up.

Each route relay when picked up is stuck up through its own front point, its individual section cancelling button, and through the route cancelling button. The stick circuit for the section control relay 1B1NR includes wire 14, the route cancelling button B1CB, wires 15, 16 and 17, contact finger 18 and front point of relay 1B1NR, wire 19, the section cancelling button 1B1CB, etc. The other control relays for each direction of traffic are supplied with stick circuits in the same manner.

To prevent run-around circuits each route relay except the last is supplied with a separate stick winding, i. e., this separate stick winding is on 1B1NR and 2B1NR, but need not be on 3B1NR since it is contemplated that it is not desired to cancel the terminal section unless all the preceding sections are already cancelled, and furthermore, as described below, means is provided to prevent this very thing. In like manner relays 3B1XR and 2B1XR have separate stick windings, but 1B1XR has not.

It is thus obvious that upon a route being set up and a plane entering the route, the route can be cancelled either section by section or as a whole by the momentary depression of the section cancelling buttons or of the route cancelling button, presumably upon advice from the pilot as he passes the various check points. Thus, with the section cancelling means a plane travelling towards port B and having passed out of section 1B1 will leave this section available for a following plane, and depending upon conditions and required headway, other planes can be dispatched in the same direction and along the same route.

In this connection the usual procedure can be to cancel each section of a route as the plane clears that section, and thus the dispatcher may readily become so accustomed to performing this act that he may attempt to cancel the indicator for section 3B1 upon a forward plane reaching port B even though previously he had dispatched a following plane along the same route. In such a situation the indicator for section 3B1 should not be cancelled until the following plane or the last plane to be entered in this route has traversed this section 3B1. Accordingly, means is provided for preventing this cancellation even though the operator inadvertently attempts to cancel when he should not.

It will be noted in Fig. 2 that each section cancelling button except the first in a route is shunted by a contact finger and front point of the next preceding section control relay. For example, cancelling button 3B1CB is shunted by contact finger 21 and front point of control relay 2B1NR, and button 2B1CB is shunted by contact finger 22 and front point of control relay 1B1NR. There is no shunt, however, across the section cancelling button 1B1CB since this is the first section for the entrance direction of travel.

Considering the exit direction of travel the cancelling buttons are shunted in a like manner although in the reverse direction, the first section for this direction of travel being section 3B1, and accordingly its cancelling button contact 23 is not shunted.

With the arrangement as set forth just above, if the operator attempts to cancel a section indication when it should not be cancelled because of a following plane, the cancelling act will be ineffective, since the shunt around the cancelling button will be closed since the control relay for the section next to the rear will have been energized.

In this Fig. 2 of drawings, the circuits for the control of routes A2 and A3 are shown, and are similar to those described above in connection with route B1. The interlock is somewhat different, however, in that route A2 for a given elevation is not available if the opposing route is already set up, and furthermore, is not available if section 1B1 of route B1 be occupied by an entering plane, or sections 2B1 and 3B1 be occupied by a leaving plane. Thus, the relays controlling these sections just referred to have back points included in the lever control circuit for the section relays. Since the various interlocks are shown clearly in the drawings, it would appear that a detailed description of these circuits should be unnecessary. The cancelling means both for route cancellation and section cancellation are the same as described above in connection with the route B1 and the safe guard against mistaken cancelling when a following plane is in a particular route, is also the same as described above.

In the above, it is contemplated that planes may be dispatched either toward or away from a port at any desired elevation. If, however, there be regulations that the odd elevations such as 3000, 5000, etc., be used for entering planes and the even elevations such as 4000, 6000, etc., be used for outgoing planes then the interlocking means described above which guards against opposing traffic as well as conflicting traffic may be modified to eliminate interlocking against opposing traffic. Although, even in this case, it is desirable to retain the interlock as a check against the dispatcher making a mistake, and attempting to route a plane on an unauthorized level for the direction of travel of the plane. In every other respect the circuits and operation can be as described above.

It may be desirable to follow the progress of a plane on the panel and this can be accomplished by cancelling various sections as they are traversed whereby to extinguish the section indicators. This might be satisfactory for a single plane, but if following planes are entered on a particular route and furthermore if a description of the plane is desired, a token may be desirable which can bear a description of the plane and can be transferred from section board to section board as the plane progresses.

As mentioned above, each section board such as the board 1B1B bears a token slot such as 1B1TS, and this and the tokens are shown more in detail in Fig. 2A. The slot includes a slight depression 25 of rectangular configuration for receiving the token. The token comprises in this case a rectangular body 26, carrying a button 27 bearing an arrow or like indicator, and having a stem 28 passing through the body 26 and rotatable therein. The stem is received in a hole 29 in the panel and is flattened on opposite sides, and covered with insulating material as at 30, whereas the stem 28 itself is of conducting material as of brass or the like. The hole in the panel which receives the stem 28 is supplied with oppositely arranged contact plates to which are connected wires 32 and 33.

Upon inserting the token into its slot, with the arrow pointing upwardly, the insulated portions on the stem bear against the conducting plates and a circuit from wire 33 to wire 32, etc., is not made up. Upon turning the button, however, for the arrow to indicate either entrance or exit travel the conducting portions of stem 28 make up the circuit including wires 33 and 32. This can be conveniently employed for initiating various means, in a different form of the invention from the one described in connection with Fig. 2, as will appear as the description progresses.

Referring now to Fig. 3, there is here shown the circuit arrangement for a modified form of system. This control means is illustrated for the route B1 and is similar to the control shown in Fig. 2, except that the section control relays as 1B1NR—1, etc., and 1B1XR—1, etc., are of the magnetic stick type as disclosed, for example, in Patent No. 1,929,094, granted October 3, 1933. These relays, however, are of the two winding type and are moved to one position or the other upon energization by one polarity or the other and retain their operated positions until operated to their other positions.

Each relay controls an indicator, as described above. Thus, if it be desired to set up route B1 in the entrance direction, lever B1L is moved to the right, and then allowed to return to its neutral biased position. If the route be available as determined by the various interlocking contacts of the relays 1A2NR—1, 1A3NR—1, etc., the section control relays 1B1NR—1, etc., are picked up in multiple and having been picked up, retain their picked up position because of their magnetic stick characteristics, as described above, and thus no separate stick circuit, as employed in the form of Fig. 2, is required.

In this form of the invention, the cancelling of the various sections of a route is accomplished by timing relays, and it is assumed that a plane upon entering a route will have traversed a section in a given time, with sufficient latitude of course for safety. Thus, the section relays are each provided with a cancelling time relay such as 1B1NTC, which designates the time canceller for the control relay of section 1B1 in the entrance direction.

Each time canceller as 1B1NTC, upon being initiated, operates a contact finger such as contact finger 35, a predetermined period of time after its initiation, which is operative to place reverse polarity on the relay it controls, as relay 1B1NR—1 to thus cause the relay to move to its other or released position, and thus extinguish its indicator as 1B1NI. Upon the first section being cancelled the section control relay as 1B1NR—1 closes its contact finger 36 on its back point to thereby initiate the next time cancelling relay 2B1NTC which, after a measured period of time, cancels its section indication, and initiates the time canceller for the section next in advance.

The initiation of the time cancelling relays can be accomplished in various manners, and in one convenient form this is accomplished by means of a token, such as described above, and this form is illustrated in Fig. 3.

It can be seen that the first time cancelling relay 1B1NTC is energized through wires 33 and 32, which are connected up by the token when the button is turned so that its arrow indicates the direction of movement of traffic.

Thus, the procedure upon obtaining a route by moving the route lever is to advise the pilot of the plane that he should enter the route and proceed along the beam at a given elevation. Upon the pilot advising the dispatcher that he has started his flight the token which has been inserted into its slot previously to reserve the route for this particular plane and with its button having the arrow pointing upwardly will be operated by the dispatcher in a manner to turn the button so that the arrow indicates entrance movement, and so to initiate the time cancelling means. In this way, the cancelling which is on a time basis and thus must be in accordance with the start of flight along the route, is not initiated until the flight is started. The timing means can be of any usual type and can measure a time period of anywhere from seconds to minutes, or even hours, and can be, for example, of the type as shown in Patent No. 2,199,335, granted to O. S. Field, on April 30, 1940.

In the form shown in Fig. 3 in addition to the automatic time cancelling means there is a route cancelling button B1CB, the momentary depression of which, together with the movement of the lever to the proper operated position, places current of reverse polarity through the interlocking contacts on the upper windings of the section control relays and causes them to release and thus cancel the route. It is of course obvious that if desired, the route cancelling button can be connected to the section relays directly through wire 36[1] without going through the lever, whereby to require merely the operation of the cancelling button without any contemporaneous operation of the lever to accomplish the cancelling function, in substantially the same manner as disclosed in connection with the form of invention shown in Fig. 2.

It should be noted in the form of invention shown in Fig. 3 that the time cancelling function is initiated by the token which remains in place and hence retains energy on the first cancelling relay 1B1NTC until it has accomplished the timing function. If no token were employed or if a token were employed but carried no circuit closing function, but this function were carried by a push button which could be momentarily depressed or accomplished by a contact which is automatically closed possibly only momentarily, the timing function would be accomplished exactly as described above, except that the timing relays would each be supplied with a stick circuit, as shown in Fig. 4.

In this Fig. 4, the control relay CR is picked up a short time after the closing of its control contact 103 (see Fig. 8) and is then stuck up through its own contact and a front contact of the section control relay 1B1NR—1. This effects the energization and thus the initiation of the timing relay 1B1NTC, provided, of course, that the section control relay is at that time in attracted position. Thus, the timing relay performs its timing function as described above even though its initiating circuit including contact 103 is opened immediately after closure.

It should be noted that the timed cancelling means in the form of invention of Fig. 3 is peculiar to, and operative for either entrance or exit travel, only, and this follows from the fact that the relays for time cancelling are successively energized in the direction of travel, whereby separate relays must be employed for entrance and exit directions. For example, initiation by the token of the timer 1B1NTC initiates a cancelling function which passes from section 1B1 to port B. However, the token which initiates operation of the time canceller 3B1XTC initiates a timing function which passes in the opposite direction, i. e., from port B to section 1B1.

As referred to above there are a plurality of routes independent of each other due to difference of elevation on each radio range beam, and corresponding to each route identified above. For example, there is route B1 on a particular radio range beam and at one elevation, as 5000 feet, also B1's at various other levels directly above and below each other such as indicated on panel 1, elevations as 1000, 2000, 3000, etc.

In Fig. 5 is shown a form of the invention whereby the separate route levers for routes differing only in elevation, i. e., such as the B1 routes, can have their functions combined in a master lever which controls any given number of B1 routes for either entrance or exit movement, or both, and in any particular order of preference.

For example, it may be desired to have the master lever control the odd elevation routes as 1000, 3000 and 5000 for entrance movement and the even elevation routes as 2000 and 4000 for exit movement. Furthermore, it may be, under certain weather conditions, that the most desirable route is at the 5000 feet elevation, the next most desirable at 3000 feet, etc., while under other weather conditions and other control factors the most desirable route may be at 3000 feet with the next most desirable route at 5000 feet, etc.

In order to accomplish these various functions as referred to just above, means is shown in Fig. 5 whereby each route on a given beam for each elevation has a pair of contacts as 40 and 41 for entrance movement control, and a pair of contacts as 42 and 43 for exit movement control. Each pair of contacts constitutes a socket for receiving a plug such as shown in Fig. 6, so as to readily connect various pairs of contacts with corresponding contacts of corresponding pairs of N and X contacts as 44—45 and 46—47. The contacts 44 and 46 are connected, respectively, to contacts 48 and 49, positioned respectively in N and X positions as indicated with respect to the cooperating master lever B1ML. This master lever, as mentioned above, can be moved to either the N or X from its shown neutral preferably biased position for obtaining a route such as B1 at the first available elevation with the various elevations arranged in order of preference whereby to obtain the most desirable available route possible with only a single lever movement.

The various contacts 40, 41, etc., constitute sockets and cooperate with such a plug jack, for example, as shown in Fig. 6. This plug jack comprises a pair of wires 51 and 52 connected at their ends to conducting portions 53 and 54 separated by insulating portions 55 in the manner usual in connection with telephone plug jacks whereby to connect up the various contacts involved as indicated diagrammatically in Fig. 5.

As shown, the 5000 foot plug jack has been inserted so as to connect the 5000 foot elevation route B1 for entrance movement with the master lever and in the first preference. The 4000 foot elevation route B1 has been connected by the 4000 foot plug jack as indicated for the entrance movement in the second preference. Either or both of these elevations of route B1 can as well have been connected for exit movement, or for both entrance and exit movements by using additional plug jacks. Furthermore, they can be connected in the reverse order of preference, that is, so as to make the 4000 foot elevation the most preferred route and second in preference the 5000 foot elevation.

As illustrated in the drawing, the routes at the elevations 3000, 2000 and 1000 have not been shown as connected to the master lever but it is obvious that these and any number of others that might be desired can equally well be connected to the master lever in any order of preference desired by merely plugging in the proper plug jacks in the proper positions. Having once been plugged in the jacks need not be disturbed until a change in the order of preference or possibly in direction be desired at which time the arrangement of plug jacks can be changed possibly preferably by some supervising dispatcher.

In Fig. 5 the complete circuits and devices for controlling the various routes have not been shown since they are very similar to those disclosed in Fig. 3, the only difference being the height interlocking means and the transfer means from one height to the other when various desired heights are not available. Thus it appears necessary merely to show the section control relays with the associated transfer relays since the cancelling functions both on a timing basis and manually are the same as described above in connection with Fig. 3.

With the above explanation it appears simplest to describe this form of invention by assuming that it is desired to obtain the route B1 for entrance movement and preferably at an elevation of 5000 feet with the next preference at 4000 feet. Accordingly, the master lever has been connected to these two elevations as illustrated in Fig. 5 by the dotted lines 61, 62, 63 and 64, representing plug jack conducting connections, all as described above.

Considering for a moment route B1 at the 5000 foot elevation the apparatus as described above includes entrance control relays 1B1NR, etc., exit control relays 1B1XR, etc., timing relays for cancelling sections of the route as in Fig. 3, and also a manually operable cancelling button B1CB which is effective for both entrance and exit movements, and located so as to be effective regardless of the position of the master lever. Also the multiple energizing circuits for the groups of relays are dependent for energy from the lever, upon interlocking back contacts in the same manner as in the forms of invention described above.

The form shown in Fig. 5 includes transfer relays as B1TrR effective for both entrance and exit moves to transfer lever energy to the most preferable available route. Each transfer relay is of the two winding type and is made slow to pick up so as to be considerably slower in picking up than are any of the route control relays. Each transfer relay has a pick-up circuit receiving energy from a bus 65 which is connected to energy when the lever B1ML is in its biased neutral position. This pick-up circuit passes through the upper winding of the transfer relay and is closed when the lever is in neutral position, and either the first entrance control relay IBINR has its contact finger 66 in attracted position or the first exit control relay 3BIXR has its contact finger 67 in attracted position.

Each transfer relay has a second pick-up circuit which includes the upper winding of the relay, the two contact fingers 66 and 67 in retracted position in series and a wire 68 which is connected to contact 40 which is the upper "N" contact for the 5000 foot elevation, and so can be conveniently termed the entrance pick-up wire. The corresponding wire 69 conveniently termed the exit pick-up wire is connected to the upper "X" contact 42 for this same 5000 foot elevation and is effective at times to pick up the transfer relay through a circuit including its lower winding, contact fingers 70 and 71 in retracted position in series of the same two first control relays IBINR and 3BIXR.

Each transfer relay, when picked up, is stuck up through an obvious stick circuit which includes the relay lower winding, its own contact finger 72 in attracted position, and either one of the contact fingers 73 or 74 of these same two first control relays in attracted position. For transferring energy from a route of one elevation to the route of elevation of next preference if the route of greater preference is not available, there are contacts 75 and 76 controlled by the transfer relay and associated respectively with the entrance pick-up wire 68 and the exit pick-up wire 69. These contacts connect these two wires when the contact fingers are in attracted positions through wires 77 and 78 respectively, to the lower "N" and "X" contacts 41 and 43 whereby to transfer lever energy to the control means for the most preferred available route.

Assume now that it is desired to obtain the most preferred route BI, that is, the one at the elevation of 5000 feet, and assume further that this route is available because it is not already set up in either the entrance or exit direction and because no conflicting routes, that is, routes A2 and A3, are already set up.

Upon moving lever BIML to the right to the "N" position energy is placed on wire 48 to pass through the plug jack connecting wire 61 to wire 79. This energy passes directly through wire 68, and the back contacts 67 and 66 to the upper winding of the transfer relay. It also passes through the various interlocking contacts IBIXR, etc., as in the forms described above, then through the manual cancelling button contact to energize the three entrance control relays IBINR, etc., in multiple, as described above. Since the transfer relay is slow to pick up the route control relays pick up first to thus open up the entrance pick-up circuit through wire 68, in this case at contact finger 66.

Upon the lever returning to neutral position, energy is placed on bus 65 to pick up the transfer relay through contact finger 66 in attracted position which transfer relay then sticks up through the stick circuit including contact finger 73 of the first entrance control relay IBINR. With the transfer relay picked up and held up, the next operation of the master lever will result in placing energy as before on one or the other of the wires 68 or 69 but this energy will be transferred through wires 77 or 78 to the lower 5000 elevation contacts to then pass through the plug jack connection and the wires 80 or 81 to the control means for the route at the elevation of next preference.

Assume now that the desired route is not available because it is already set up either in the direction desired or in the opposing direction. In each case the transfer relay has already been picked up and stuck up, and the transfer of energy occurs as above.

Assuming now that the desired route is not available because a conflicting route such, for example, as the route A2, has already been set up, and that the part of this route A2 which conflicts with the route BI has not been cleared. In this case, if it be for an entering move the contact finger of relay IA2NR will be in attracted position and no energy can pass from wire 79 through the interlocking contacts to the route relays. Energy, however, does pass through wire 68, assuming the lever has been moved to the "N" position, and the transfer relay is picked up through its entrance pick-up circuit including contact fingers 66 and 67 in retracted position to thereby transfer energy from the wire 79 to the wire 77 and thence through the plug jack connection to the control of the route at the next preferred elevation. This clears such route if it be available. Since neither the entrance nor the exit route control relays of the route at elevation 5000 are picked up, the transfer relay does not stick up but remains up so long as the lever remains in its operated "N" position and thus the transfer is effected as before.

One other condition, which in reality is not different from what is considered above, can exist. This is the condition where a forward plane has perhaps entered section 3BI, traveling in the entrance direction and the time cut-out means, which is the same as in Fig. 3, has operated to deenergize the control relays IBINR and 2BINR. With the first of these relays deenergized the transfer relay will be deenergized, and hence, if the lever be moved to the "N" position to obtain the most desired route then available the portion of route BI which is now available for a following plane will be obtained and on returning the lever to its neutral position the transfer relay will be picked up as before so as to route energy to the route of elevation of next preference upon the next operation of the master lever. In other words, the system operates to select the most preferred route that is available or the portion of the most preferred route which is available.

Referring now to Fig. 7, there is here shown a modified form of the invention which differs only slightly from the form described in connection with Fig. 5. In this form of the invention the route relays are the same as described above and can be cancelled out by time control means as described above, or, if desired, can be cancelled by a manually operable route cancelling button as BICB. The interlocking contacts are the same as described, but the transfer relay BITrR is not made slow acting since it receives no energy when the lever is moved to operated position unless the route desired is not available, in which case the transfer relay picks up and sticks up to transfer lever energy to the control means for the route of the height of next preference while the lever is still in operated position.

For example, assume that the control means for the elevation 5000 for route BI is connected to the master lever for entrance control as with the case in the Fig. 5 form above, and furthermore, that this route BI is available for entrance moves and the master lever is moved to the "N" position. In such circumstances energy passes through wires 84 and 85 the various interlocking contacts of the various relays IB1XR, etc., and the contact 86 of the manual cancelling button B1CB, to energize the entrance control relays IB1NR, etc., in multiple, as before.

Upon the lever returning to neutral position energy is placed on the bus 87 which corresponds to bus 65 of Fig. 5 to energize the transfer relay through a front point of either the first entrance control relay IB1NR or the first exit control relay 3B1XR, as the case may be. This transfer relay when picked up is stuck up as described before in connection with the form of Fig. 5 to thereby maintain its contact fingers 88 and 89 in attracted positions so as to route lever energy through wire 90 or 91 to the control means for the route of the height of next preference, upon the next lever operation.

In the event the desired route be not available because it is already set up either in the desired direction or the opposing direction, the transfer relay will already have been picked up and stuck up, and the lever energy in operated position will be transferred to the control for the route for the height of next preference.

If the desired route be not available because a route which conflicts with it is already set up, as, for example, route A2 and the section IA2 has not been cleared, then the contact fingers of relay IA2NR, for example, will be in attracted position and energy will pass, for example, from wire 85 through this relay contact finger 93 and the entrance pick-up wire 94 which corresponds to wire 68 of the form of Fig. 5, to pick up the transfer relay through back points of the first entrance and exit control relays. This operates to transfer lever energy on this same lever movement to the control means for the route of height of next preference.

Thus, in this form of the invention the preference between the route control relays and the transfer relay which is obtained in the form of Fig. 5 on a time basis by making the transfer relay slower to pick up than are the route control relays, is obtained positively in the form of Fig. 7. This results from conditioning the energy passing to the transfer relay either through the entrance pick-up wire 94 or the exit pick-up wire 95, and in attracted position one or more of the interlocking contacts such as contacts 93 and 96, for example.

In connection with the forms of invention shown in Figs. 5 and 7, it will be noted that stick energy for the transfer relays is isolated from the system by a back contact of the associated first route control relay both for entrance and exit directions. If this were not the case, stick energy could feed back through, for example, the exit pick-up wire 69, and transfer relay contact 76 in attracted position to lower "X" contact 43. Hence, if the system were connected for exit control the master control lever energy could then pass to the control means for the route of height of next preference even though the lever were back in neutral position and another route had already just previously been obtained.

This same blocking of stick energy from the system could of course be accomplished by using a separate winding on the transfer relay for a stick winding. The same conditions exist in connection with the form of invention of Fig. 7, and are satisfactorily controlled by the same blocking means.

It should be noted that in the various forms of invention described above, cancelling means of the manually operable type has been employed, and has required merely the momentarily moving of a contact which then can be allowed to be restored to its normal position. In the form of invention of Fig. 5, for example, the moving of the route cancelling button B1CB in the case of either entrance or exit moves places energy of reverse polarity momentarily on the route relays which are of the magnetic stick type, to cause them to assume and retain their retracted positions until operated therefrom. This is accomplished by momentarily moving a contact such as contact 98, for example.

It is contemplated that automatic cancelling means might be desirable and accordingly it is proposed in accordance with this invention, as shown in Fig. 8, to accomplish this cancelling automatically by momentarily moving a contact. Thus, it is obvious that any of the manual cancelling means described above, and which require merely the movement momentarily of a contact, can be replaced, if desired, by the automatic means described below in connection with Fig. 8.

One automatic means for accomplishing cancelling is effected by apparatus including a device such as the usual well-known radio altimeter. This device operates ordinarily from a plane to determine the distance from the plane to the ground beneath the plane and is very accurate in its operation. It comprises means located on the plane capable of sending radiant energy of a type that can be directed toward the ground together with a receiver which receives energy both directly from the sending apparatus and also energy as reflected from the ground. The time required for the energy to pass to the ground and return depends upon the distance of the plane from the ground and this time required determines the phase displacement of the received reflected energy with respect to the directly received energy. This phase displacement which, may be a part of a cycle, or if the distance be relatively great and the wave length relatively short, perhaps several complete cycles plus possibly a fraction of a cycle, is employed for operating a needle over a scale which directly indicates the height of the plane from the ground.

In the present case it is contemplated that the apparatus and the plane are reversed in that the transmitting and receiving apparatus is located on the ground and the energy is directed toward the path of a plane at the point where its path crosses a check point. Thus, the energy which is reflected from the plane when the plane passes over a check point returns to the receiving apparatus, and is displaced in phase from the directly received energy, an amount depending upon the height of the plane from the ground. The receiving apparatus is arranged to respond distinctively to the position of the altimeter needle, and effect cancelling.

A proposed apparatus for effecting automatic cancelling is shown in a wholly schematic form in Fig. 8. In this Fig. 8, there is represented a radio transmitter of the short-wave directional type having a sending antenna 100 for sending energy upwardly to intersect a plane route at a check point on a route, such, for example, as where one route crosses another. This general route, as, for example, route B1 exists at each of various elevations as 5000, 4000, etc., as indicated in Fig. 8. The energy from the transmitter is confined to a relatively narrow band intersecting the route as indicated by the lines 101 so that a plane traversing this route at any one of the various elevations employed will, when passing the check point, cause the energy from the transmitter to be reflected back again to the general position of the transmitter which is located on the ground beneath.

Adjacent the transmitter is a radio receiving apparatus having a receiving antenna 102, and since this receiver is within a short distance such as 20 or 30 feet, more or less, from the transmitter, it receives not only the reflected energy but also receives energy directly from the transmitter through, of course, suitable shields. These two sets of waves are displaced in phase a fraction of a cycle, or perhaps several cycles, due to the time required for the reflected waves to reach the receiver and causes the altimeter Alt., connected thereto, to assume a position corresponding to the height of the plane which produces the reflection.

The altimeter, as indicated, has a plurality of contacts 103–107 corresponding respectively to the heights 5000–1000 and are made up by the pointer 108. For example, the plane 109, represented as following a route as B1 at the 5000 foot level causes closure of contact 103. Each contact, as 103, is connected to a cancelling relay CR, each of which is normally deenergized but which is energized upon receiving energy through its contact on the altimeter. Thus, the cancelling relay for the 5000 foot elevation for this particular route which can be assumed to be route B1 is shown in picked up condition. This momentary energization of a cancelling relay upon a plane passing a check point, supplied with automatic cancelling means, is employed to open the stick circuit for the route controlling relay then effective, as, for example, section control relay 1B1NR. The cancelling relays as CR are made slow to pick up so as not to respond to the passing of the indicator 108 over it. If desired, of course, the actual control of the relays, as CR, can be indirectly effected by intermediate relay means, in turn controlled by the needle 108.

The section control relay is shown in this figure of drawing as having a stick circuit which can be opened by the picking up of the cancelling relay by section cancelling button 1B1CB and also by route cancelling button B1CB. Thus, the route can be cancelled manually as an entirety, can be cancelled manually section by section, and can be cancelled automatically section by section, as is clear from the diagram and the above description.

It is to be understood that all manual cancelling means can be dispensed with, if desired, and only automatic cancelling means can be employed.

Furthermore, while automatic cancelling means is shown for cancellation of the separate sections of a route, this type of automatic cancelling means can as well be employed to replace route cancelling buttons such as button B1CB, in which case the radio transmitter and receiver for controlling automatic cancelling will be positioned at the end of a route.

As discussed above, this automatic cancelling apparatus is shown very diagrammatically since it operates on the well-known principle of the radio altimeter. The control is very critical so that a plane at one elevation will not affect a cancelling relay for any largely different elevation and since each plane ordinarily maintains a considerable elevational distance from other planes, both above and below it, this cancelling apparatus can be made very dependable.

The above rather specific description of several forms which the invention can assume has been given solely for the purpose of illustration and is not intended in any manner whatsoever in a limiting sense. It is to be understood that various modifications, adaptations and alterations may be applied as may be desired from time to time, all to meet the requirements of practice without in any manner departing from the spirit or scope of the invention except as limited by the appended claims.

Having described our invention, we now claim:

1. An airplane dispatching system, including a dispatcher's panel, a plurality of conflicting air routes all at the same elevation, represented on the panel, each route being separated into sections defined by check points recognizable by a plane pilot as his plane passes them, two normally inactive indicators for each section, one for entrance and the other for exit travel, a single individual biased-to-neutral manual control lever for each route movable from the neutral to either an operated entrance or exit position, circuit control means for each route for the indicators effective to set up a route by making active all the section indicators of the route for either entrance or exit travel upon momentarily positioning the route lever at either the entrance or the exit position, and then only if no opposing or conflicting route is already set up, circuit maintaining means effective to maintain active an active indicator, unless cancelled, and a separate manual cancelling means for each route section effective upon operation to make inactive the indicators for its section.

2. An airplane dispatching system, including a dispatcher's panel, a plurality of conflicting air routes all at the same elevation, represented on the panel, each route being separated into sections defined by check points recognizable by a plane pilot as his plane passes them, two normally inactive indicators for each section, one for entrance and the other for exit travel, an individual control lever for each route movable from a neutral to either an operated entrance or exit position, circuit control means for each route for the indicators effective to set up a route by making active all the section indicators of the route for either entrance or exit travel upon positioning the route lever at either the entrance or the exit position, and then only if no opposing or conflicting route is already set up, a route cancelling means for each route, effective upon operation to make inactive all the indicators for its route, and automatic means associated with each check point and responsive to the presence of a plane at the check point and then only if the plane is at approximately said same elevation to cause operation of the cancelling means of the section the exit end of which is defined by that check point.

3. An airplane dispatching system, including a dispatcher's panel, a plurality of conflicting air routes all at the same elevation, represented on the panel, each route being separated into sections defined by check points recognizable by a plane pilot as his plane passes them, two normally inactive indicators for each section, one for entrance and the other for exit travel, an individual control lever for each route movable from a neutral to either an operated entrance or exit position, circuit control means for each route for the indicators effective to set up a route by making active all the section indicators of the route for either entrance or exit travel upon positioning the route lever at either the entrance or the exit position, and then only if no opposing or conflicting route is already set up, cancelling means for each route section effective upon operation to make the indicators for its section inactive, a route cancelling means for each route, effective upon operation to make all the indicators for its route inactive, and automatic means associated with each check point and responsive to the presence of a plane at the check point and then only if the plane is at approximately said same elevation, to cause operation of the cancelling means of the section the exit end of which is defined by that check point.

4. An airplane dispatching system, including a dispatcher's panel, a plurality of conflicting air routes all at the same elevation, represented on the panel, each route being separated into sections defined by check points recognizable by a plane pilot as his plane passes them, two normally inactive indicators for each section, one for entrance and the other for exit travel, an individual control lever for each route movable from a neutral to either an operated entrance or exit position, circuit control means for each route for the indicators effective to set up a route by making active all the section indicators of the route for either entrance or exit travel upon positioning the route lever at either the entrance or the exit position, and then only if no opposing or conflicting route is already set up, normally inactive timing cancelling means for each route effective on initiation to successively make inactive the indicators for its route for entrance or exit travel at different time intervals after initiation, and means for initiating the time cancelling means.

5. An airplane dispatching system, including a dispatcher's panel, a plurality of conflicting air routes all at the same elevation, represented on the panel, each route being separated into sections defined by check points recognizable by a plane pilot as his plane passes them, two normally inactive indicators for each section, one for entrance and the other for exit travel, an individual control lever for each route movable from a neutral to either an operated entrance or exit position, circuit control means for each route for the indicators effective to set up a route by making active all the section indicators of the route for either entrance or exit travel upon positioning the route lever at either the entrance or the exit position, and then only if no opposing or conflicting route is already set up, a route cancelling means for each route, effective upon operation, to make inactive all the indicators for its route, normally inactive timing cancelling means for each route effective on initiation to successively make inactive the indicators for its route for entrance or exit travel at different time intervals after initiation, and means for initiating the time cancelling means.

6. An airplane dispatching system, including a dispatcher's panel, a plurality of conflicting sets of air routes represented on the panel, each set of routes including a plurality of routes all in the same vertical plane and at different heights so as to be separate and wholly non-conflicting, each route being separated into sections defined by check points recognizable by a plane pilot as his plane passes them, two normally inactive indicators for each section, one for entrance and the other for exit moves, an individual, manual, control lever for each route movable from a neutral to either an entrance or exit operated position, circuit control means for the indicators effective to set up a route by making active all the section indicators of a route for either entrance or exit travel upon movement of the route lever to either entrance or exit position only if no opposing or conflicting route is already set up, a manual master lever for each set of routes and each movable from a neutral to an exit and an entrance position, detachable plug jack connectors for each route for connecting each route of a set of routes to the master lever for either entrance or exit control and in any desired order of preference of routes, and circuit means for setting up the first available route in the order of preference then in force, upon each operation of the master lever.

7. An airplane dispatching system, including a dispatcher's panel, a plurality of conflicting sets of air routes represented on the panel, each set of routes including a plurality of routes all in the same vertical plane and at different heights so as to be wholly separate and non-conflicting, each route being separated into sections defined by check points recognizable by a plane pilot as his plane passes them, two normally inactive indicators for each section, one for entrance and the other for exit moves, an individual manual control lever for each route movable from a neutral to operated entrance and exit positions, circuit control means for the indicators effective to set up a route by making active all the section indicators of a route for either entrance or exit moves upon movement of the route lever to either entrance or exit position only if no opposing or conflicting route is already set up, a separate manual master lever for each set of routes and movable from a neutral to exit and entrance positions, detachable manual plug jack means for each route for connecting each route of a set of routes to the master lever for either entrance or exit control and in any desired order of preference of routes, manual cancelling means for each route section effective upon operation to make the indicators for its section inactive, and circuit means for setting up the first available part or complete route in the order of route preference then in force, upon each operation of the master lever.

8. An airplane dispatching system including a dispatcher's panel, an air route represented on the panel and separated into a plurality of sections defined by check points, a normally inactive indicator for each section for one direction of travel, a control lever for the route movable from a neutral to an operated position, a normally inactive control relay for each section, circuit means effective on positioning the lever in operated position to make all the control relays and indicators active and a normally inactive timing cancelling means including a timer for each section operable a predetermined time after initiation, circuit means for each section control relay and indicator effective upon operation of the section timer to make the relay and indicator inactive, manual means to initiate the timer for the first section in said one direction, and circuit means for initiating each of the following timers effective when the control relay for the next preceding section is inactive and the control relay for its section is active.

9. In airplane dispatching systems in combination, a panel, an air route represented on the panel, means separating the route into a plurality of sections, an indicator for each section, a control relay for each indicator, a cancelling device for each section, manual means for energizing all the relays, an energizing circuit for each indicator closed upon energization of its control relay, an energizing circuit for each device, manual means for closing the energizing circuit of one of the end section devices, automatic means for closing each of the circuits for the other devices and each requiring the energization of its relay and the deenergization of the relay of the next preceding section, and circuit means effective to deenergize each relay a predetermined time after the energization of its device.

10. An airplane dispatching system including, a dispatcher's panel, an air route represented on the panel and separated into a plurality of sections defined by check points, a normally inactive indicator for each section for one direction of travel, a control lever for the route movable from a neutral to an operated position, a normally inactive control relay for each section, circuit means effective on positioning the lever in operated position to make all the control relays and indicators active and a normally inactive timing cancelling means including a timer for each section operable a predetermined time after initiation, circuit means for each section control relay and indicator effective upon operation of the section timer to make the relay and indicator inactive, automatic means to initiate the timer for the first section in said one direction, and circuit means for initiating each of the following timers effective when the control relay for the next preceding section is inactive and the control relay for its section is active.

11. An airplane dispatching system including, a dispatcher's panel, an air route represented on the panel and separated into a plurality of sections defined by check points, a normally inactive indicator for each section for one direction of travel, a control lever for the route movable from a neutral to an operated position, a normally inactive control relay for each section, circuit means effective on positioning the lever in operated position to make all the control relays and indicators active and a normally inactive timing cancelling means including a timer for each section operable a predetermined time after initiation, circuit means for each section control relay and indicator effective upon operation of the section timer to make the relay and indicator inactive, automatic means to initiate the timer for the first section in said one direction and including a transmitter for directionally sending radiant energy from the ground to a plane entering the first section of the route, an energy receiver adjacent the transmitter for receiving energy directly from the transmitter and energy from the transmitter after it is reflected from said plane and means on the ground responsive to this directly and indirectly received energy to initiate the timer for the first section in said one direction, and circuit means for initiating each of the following timers effective when the control relay for the next preceding section is inactive and the control relay for its section is active.

12. In airplane dispatching systems in combination, an air route at a given elevation represented on a panel, check points separating the route into sections, a normally inactive indicator for each section, a route lever movable from a neutral to an operated position, circuit control means effective to set up the route by making active all the indicators upon positioning the lever in operated position, a section cancelling means for each section effective upon operation to make its indicator inactive, and automatic means associated with each check point and responsive to the presence of a plane at the check point and then only if the plane be at approximately said given elevation to cause operation of the cancelling means of that section the exit end of which is defined by that check point.

13. In airplane dispatching systems in combination, an air route at a given elevation represented on a panel, check points separating the route into sections, a normally inactive indicator for each section, a route lever movable from a neutral to an operated position, circuit control means effective to set up the route by making active all the indicators upon positioning the lever in operated position, a section cancelling means for each section effective upon operation to make its indicator inactive, and radio responsive means on the ground and substantially beneath each check point responsive to the presence of a plane at the check point to cause operation of the cancelling means of that section the exit end of which is defined by that check point.

14. In airplane dispatching systems in combination, an air route at a given elevation represented on a panel, check points separating the route into sections, a normally inactive indicator for each section, a route lever movable from a neutral to an operated position, circuit control means effective to set up the route by making active all the indicators upon positioning the lever in operated position, a section cancelling means for each section effective upon operation to make its indicator inactive and radio responsive means including a directional radio transmitter and a radio receiver on the ground and substantially beneath each check point responsive to the presence of a plane at the check point to cause operation of the cancelling means of that section the exit end of which is defined by the check point.

15. In airplane dispatching systems in combination, an air route at a given elevation represented on a panel, check points separating the route into sections, a normally inactive indicator for each section, a route lever movable from a neutral to an operated position, circuit control means effective to set up the route by making active all the indicators upon positioning the lever in operated position, a section cancelling means for each section effective upon operation to make its indicator inactive and radio responsive means including a directional radio wave transmitter, a radio receiver, an altimeter controlled by the receiver and contacts selectively controlled by the altimeter positioned on the ground and substantially beneath each check point and responsive to the presence of a plane at the check point and only if substantially at said given elevation to cause operation of the cancelling means of that section the exit end of which is defined by that check point.

16. In a plane dispatching system, in combination; a dispatcher's panel; a plurality of conflicting sets of routes represented on the panel; each set including a plurality of nonconflicting, wholly separate, routes, each route being separated into sections defined by check points recognizable by a plane pilot as his plane passes them; two normally inactive indicators for each section, one for entrance and the other for exit moves; an individual manual control lever for each route movable from a neutral to operated energizing entrance and exit positions; a circuit control means for the indicators for each route effective when energized by its lever to set up a route by making active all the section indicators of a route for either entrance or exit travel upon movement of the route lever to either entrance or exit position, and then only if no opposing or conflicting route be already set up; a single manual master lever movable from neutral to operated entrance and exit positions for each set of routes; a control bus connected to energy at one end when the master lever is in operated position; detachable manual plug means for readily connecting each of the routes of each set to its control bus in any of various desired orders of preference as determined by the distance of the connection from the master lever; a transfer relay for each route effective, when energized, to route the control by the master lever to the next following route circuit control means; and transfer circuit means controlling the transfer relay and effective to energize the transfer relay when the master lever is in operated position and then only if its route is unavailable.

17. An airplane dispatching system, including; a dispatcher's panel; a plurality of conflicting sets of routes represented on the panel, each set including a plurality of non-conflicting routes; a separate manual individual lever for each route movable from neutral to operated position; a separate manual master lever for each set of routes and movable from neutral to operated positions; a control bus for each set having a gap therein for each route of its set and connected to energy at one end when the master lever is in operated position; indicating means for each route which, when active, indicates the route is set up; circuit control means for each route effective to set up the route upon operation of its individual lever only if no conflicting route is then set up; detachable plug connecting means to connect the circuit control means of the routes of each set of routes, in any order of preference, to its bus, and each at that side of a different gap nearer to the master lever; a normally open shunt across each gap; a normally deenergized transfer relay for each route effective, when energized, to close the shunt across its gap; an energizing circuit for each transfer relay closed only when the master lever is in neutral position and its route is set up; and a transfer circuit for energizing each transfer relay and effective to energize a transfer relay only when the master relay is in operated position and then only if its route is not available due to a conflicting route being set up.

18. In an airplane dispatching system, in combination; a panel; a representation on the panel of a plurality of air routes; a control wire and a transfer wire for each route; a master lever common to all the routes and movable from a neutral to an operated position; a bus connected at one end to energy of one polarity when the lever is in operated position; a plurality of gaps in the bus, equal in number to the number of routes, and spaced progressively different distances from the lever; detachable jumpers connecting the control wires to the bus, each at a different gap and at the sides of the gaps nearer the lever, and the associated transfer wires respectively, at the other sides of the gaps, in any desired distance-from-the-lever order of routes; a transfer bus connected to energy of one polarity when the lever is in neutral position; each control wire branching into two multiple branches and each connected to energy of the other polarity; a route relay in one multiple branch of each route; a transfer relay, slower to pick up than is its route relay, in the other multiple branch of each route; a back point of each route relay in series with its transfer relay; a pick-up circuit for each transfer relay including a front point of the associated route relay and the transfer bus; a shunt circuit across each gap closed only when the associated transfer relay is energized; and a stick circuit for each transfer relay including a front point of the associated route relay.

19. In an airplane dispatching system in combination; a panel; a representation on the panel of a plurality of nonconflicting air routes at least some of which has, each, at least one route conflicting with it; a lock contact for each conflicting route movable to locking and unlocking position, respectively, when its route is cleared, or not cleared; a control wire and a transfer wire for each said nonconflicting route; a master lever common to all the nonconflicting routes and movable from a neutral, to an operated position; a bus connected at one end to energy of one polarity when the lever is in operated position; a plurality of gaps in the bus equal in number to the number of nonconflicting routes and progressively spaced different distances from the lever; detachable jumpers connecting the control wires to the bus, each at a different gap and at the side of the gap nearer the lever, and the associated transfer wires, respectively, at the other sides of the gaps, in any desired distance-from-the-lever order of routes; a transfer bus connected to energy of one polarity when the lever is in neutral position, each control wire branching into two multiple branches and each connected to energy of the other polarity; in each case a route relay in one multiple branch, the lock contact of any corresponding conflicting route being in series with, and closing, said one multiple branch when in unlocking position; a transfer relay slower to pick up than is the associated route relay, in the other multiple branch; a back point of the route relay in series with the transfer relay; a pick-up circuit for each transfer relay including a front point of the associated route relay and the transfer bus; a shunt across each gap closed only when the associated transfer relay is energized; and a stick circuit for each transfer relay including a front point of the associated route relay.

20. An airplane dispatching system, including; a dispatcher's panel; a plurality of nonconflicting routes, various of which has, each, a conflicting route; all represented on the panel, an individual lever for each route movable from neutral to operated position; a master lever common to all the nonconflicting routes, and movable from neutral to operated positions; indicating means for each route, which when active, indicates the route is set up; circuit control means for each route effective to set up its route upon energization only if no conflicting route is then set up; each individual lever when in operated position energizing its circuit control means; a control bus; a plurality of gaps in the bus equal in number to that of the nonconflicting routes, and progressively spaced from one end of the bus; a transfer bus, the master lever when in neutral position placing energy on the transfer bus, and when in operated position, placing energy on said one end of the control bus; detachable plug connectors selectively connecting each circuit control means of each nonconflicting route to the control bus and each to a different gap at its side nearer the master lever; a normally open shunt across each gap; a transfer relay for each nonconflicting route, effective when energized to close its shunt; an energizing circuit for each transfer relay closed only when the master lever is in neutral position and its route is set up; and a transfer circuit for energizing each transfer relay and effective to energize a transfer relay only when the master lever is in operated position and only if its route and all routes connected between it and the master lever, are not then available due to already being set up, or to routes conflicting therewith being already set up.

21. In an airplane dispatching system; in combination with a plurality of routes arranged in order; a control circuit for each route, including, a normally deenergized route relay effective when energized to set up its route; a normally deenergized transfer relay; a conflicting route lock contact movable to locking and unlocking positions; a control circuit for the route relay including the lock contact in unlocking position; a first energizing circuit for the transfer relay including a contact and back point of the route relay; a second energizing circuit for the transfer relay including the contact and front point of the route relay; a transfer circuit between each control circuit and the next following control circuit closed only when the transfer relay of said each control circuit is energized; and a two-position lever in one position energizing the route relay circuit and the first energizing circuit of the transfer relay, and in the other position energizing the second circuit of the transfer relay, of the control circuit of the first route only.

22. In an airplane dispatching system; in combination with a plurality of routes arranged in order; a control circuit for each route, including, a normally deenergized route relay effective when energized to set up its route; a normally deenergized transfer relay; a conflicting route lock contact movable to locking and unlocking positions; a control circuit for the route relay including the lock contact in unlocking position; a first energizing circuit for the transfer relay including a contact and back point of the route relay; a second energizing circuit for the transfer relay including the contact and front point of the route relay; a transfer circuit between each control circuit and the next following control circuit closed only when the transfer relay of said each control circuit is energized; and a two-position lever in one position energizing the route relay circuit and the first energizing circuit of the transfer relay, and in the other position energizing the second circuit of the transfer relay, of the control circuit of the first route only, each transfer relay being slower to pick up than its associated route relay.

23. In an airplane dispatching system; in combination with an air route; circuit means for controlling the route and including a normally inactive route relay effective, when active, to set up the route; a normally inactive transfer relay; a conflicting route lock contact movable to locking and unlocking positions; a two-position lever; a control circuit for the route relay including a contact controlled by the lever in one position and the lock contact in unlocking position; a first control circuit for the transfer relay including the contact controlled by the lever in said one position and a contact of the route relay in inactive position; a normally inactive transfer circuit active only when the transfer relay is active; and a second control circuit for the transfer relay including a contact controlled by the lever in the other position and the contact of the route relay in active position.

24. In an airplane dispatching system, in combination; an air route; circuit means for controlling the route and including a normally inactive route relay effective when active to set up the route; a normally inactive transfer relay, slower to become active than is the route relay; a conflicting route lock contact movable to locking and unlocking positions; a two-position lever; a control circuit for the route relay including a contact controlled by the lever in one position and the lock contact in unlocking position; a first control circuit for the transfer relay including the contact controlled by the lever in said one position and a contact of the route relay in inactive position; a normally inactive transfer circuit active only when the transfer relay is active; and a second control circuit for the transfer relay including a contact controlled by the lever in the other position and the contact of the route relay in active position.

25. In an airway traffic control system, the combination with an air route divided into sections, an indicator for a section having a normally inactive proceed aspect, means for controlling said indicator to render such aspect effective, a radio receiver for each section located on the ground below the air route and tuned to respond to radio energy of a particular frequency, a radio transmitter for each receiver and tuned to emit radio energy of the frequency of its associated radio receiver and constructed to transmit such radio energy upwardly in a relatively narrow beam, and means for each receiver and controlled thereby and effective to automatically control the associated indicator so as to render said proceed aspect inactive in response to radio energy emitted by said transmitter and reflected from an airplane flying over the transmitter and receiver location, whereby said indicator is automatically restored to normal when an airplane in its flight over the route passes over such location.

26. In combination, an air route including a plurality of ground located fixes, a central office, electro-responsive means for each fix in said office, a radio receiver for each fix located at such fix and responsive to radio energy of a particular frequency transmitted downwardly, a radio transmitter for each fix continuously emitting upwardly directed radio energy through a limited area over such fix and of the same frequency as the frequency to which its associated receiver is tuned, and means effective to cause any particular electro-responsive means in said office to be operated each time the corresponding radio receiver receives energy of said particular frequency, whereby if an airplane flies over a particular fix the electro-responsive means for such fix in said office is operated to manifest the presence of such airplane due to radio energy reflected by such airplane.

27. In combination with an air route including a plurality of sections having ground located markers at junctions of adjacent sections, an indicator for each altitude associated with the entrance end of each section for a particular direction of traffic over the air route and constructed to at times display a proceed aspect, a radio receiver for each marker, and means for causing such radio receiver to respond distinctively to the altitude of flight of an airplane directly over that marker to extinguish the proceed aspect of the indicator for that altitude for the marker next in the rear of such receiver, whereby an indicator for manifesting traffic conditions for an air traffic channel of a particular altitude in a particular section is controlled to manifest a different traffic condition when an airplane flying at such altitude passes out of the section the entrance end of which such indicator is associated with.

28. In a system for automatically reporting the passage of airplanes over ground located fixes, means including radio communication apparatus for each of a plurality of fixes each responsive to the presence and measuring the altitude of an airplane within a limited area over that fix, relays in a distant control office one for each of a plurality of different altitudes for each of said fixes, and means including a line wire extending from the said fixes to said control office and governed by said radio communication apparatuses at the respective fixes for selectively controlling the operation of said relays so as to actuate the relay for the altitude at which an airplane is flying over a fix for that fix in said control office the radio communicating apparatus of which is then controlling said line wires.

29. In a system for automatically detecting the passage of an airplane over the fix location of an airway, a plurality of electro-responsive devices in a distant control office relating to the different altitudes, radio communication apparatus associated with a fix and controlled automatically in accordance with the presence of an airplane within a limited area above that fix and the altitude at which such airplane passes over that fix, and means governed by said radio communication apparatus for selectively controlling the energization of said electro-responsive devices in the control office in accordance with the altitude at which an airplane passes over said fix.

STUART J. MACKEY.
HAROLD S. WYNN.